H. R. BOSWELL.
TRACTOR PLOW.
APPLICATION FILED FEB. 10, 1915.
1,157,670.
Patented Oct. 26, 1915.
3 SHEETS—SHEET 3.
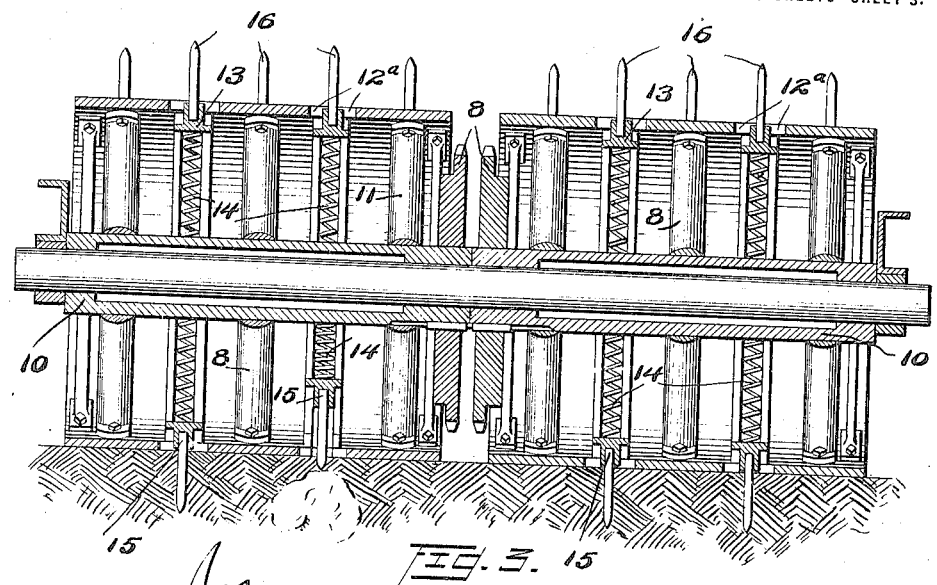
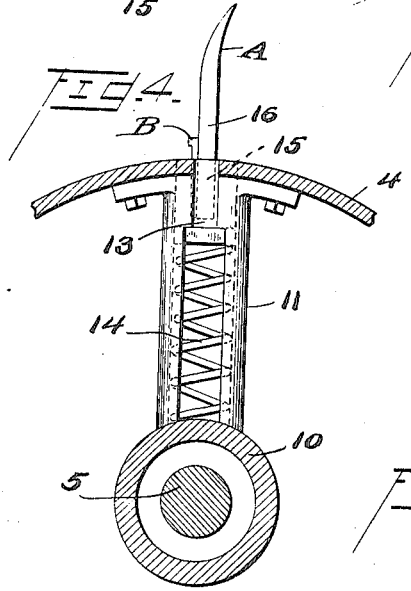
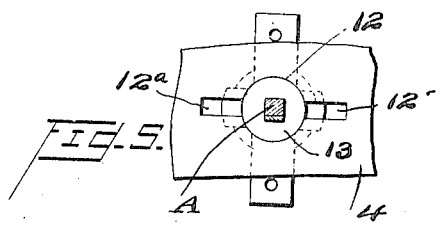
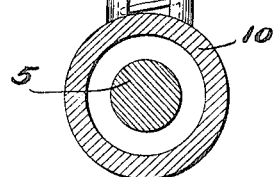
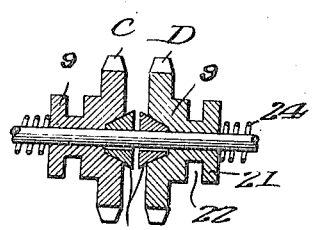
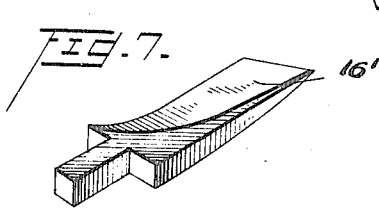
Witnesses
Inventor
Henson R. Boswell
By
Attorney

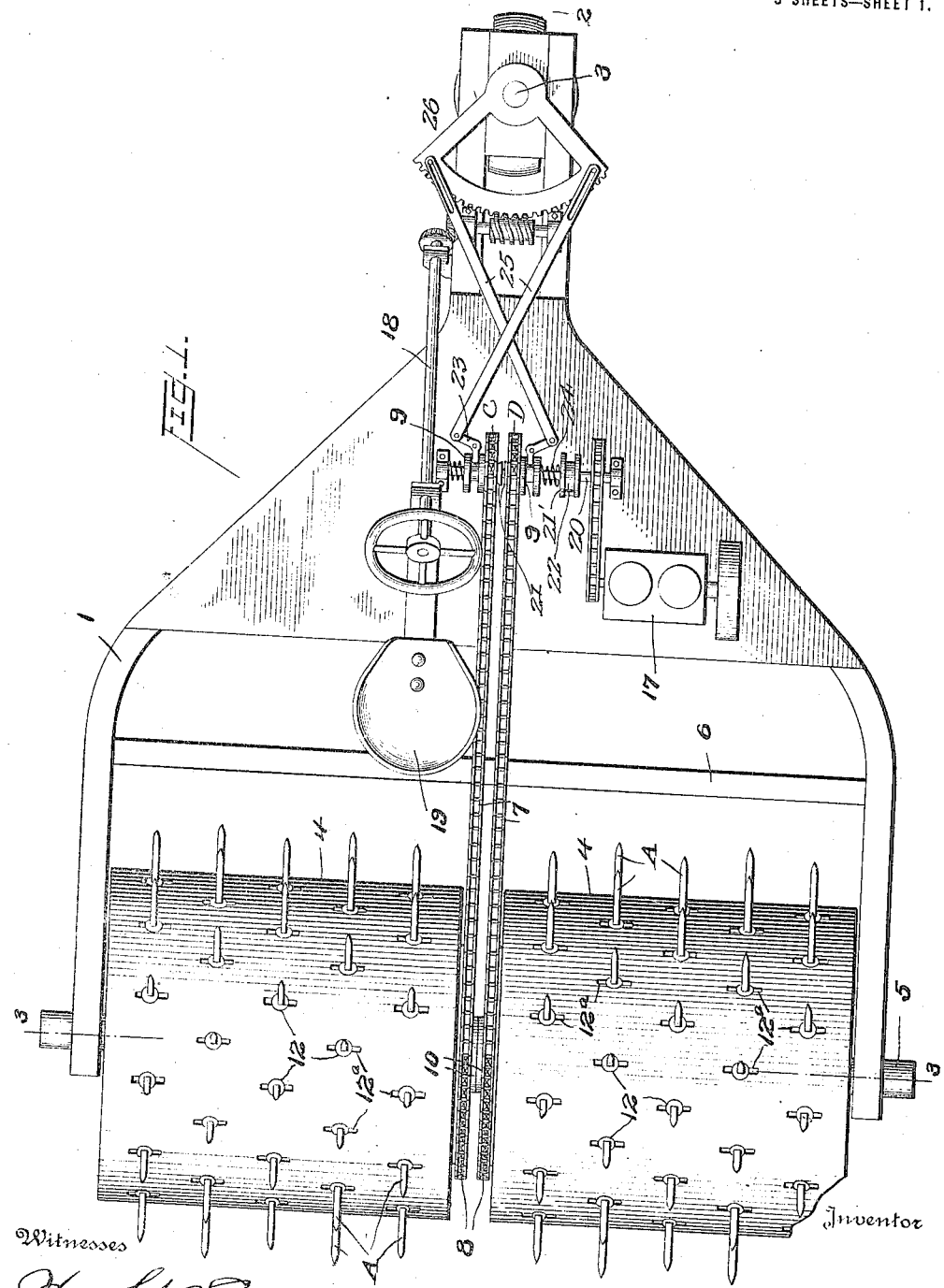

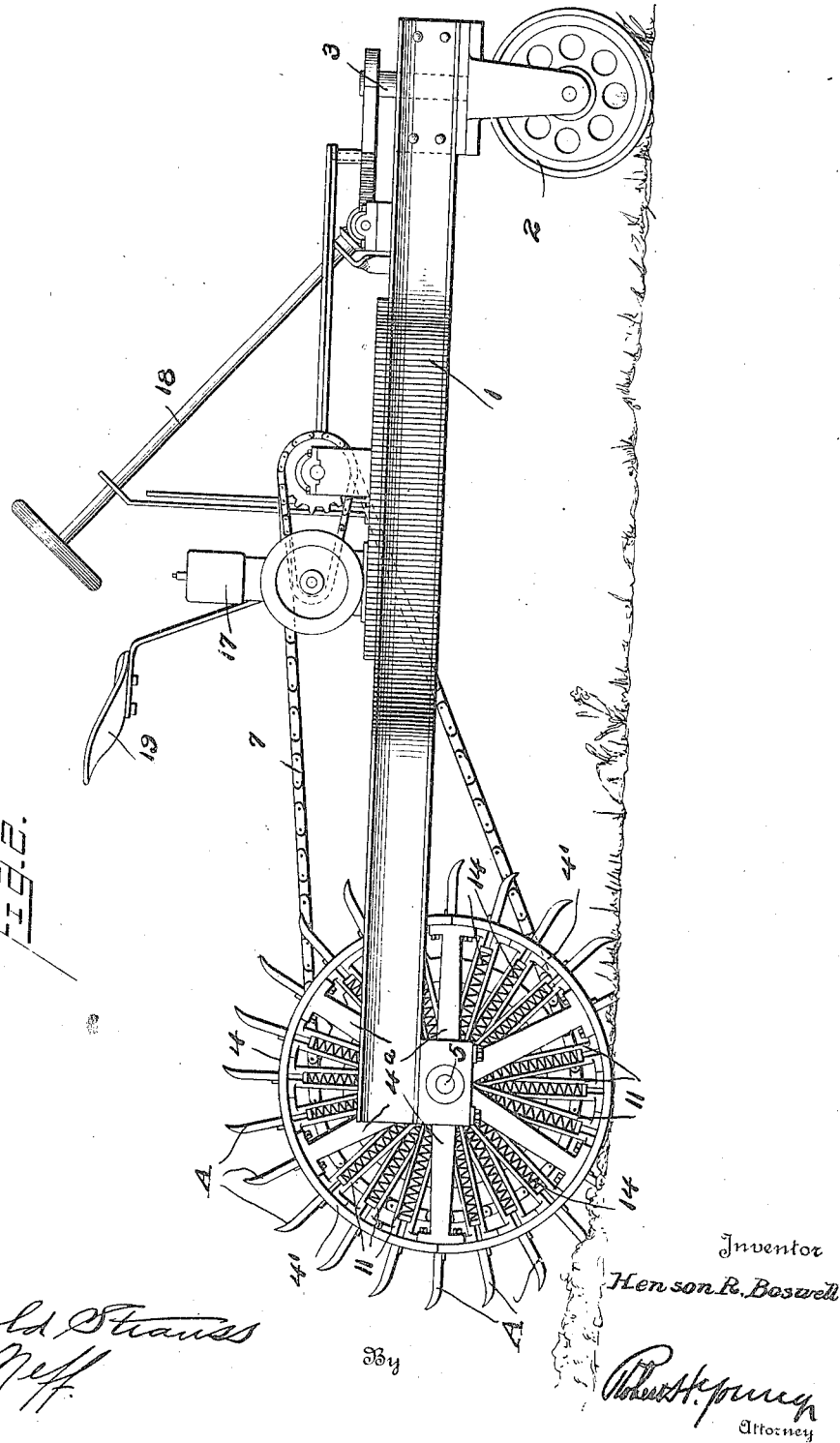

UNITED STATES PATENT OFFICE.

HENSON R. BOSWELL, OF GREENWOOD, VIRGINIA.

TRACTOR-PLOW.

1,157,670.

Specification of Letters Patent.  Patented Oct. 26, 1915.

Application filed February 10, 1915. Serial No. 7,233.

*To all whom it may concern:*

Be it known that I, HENSON R. BOSWELL, a citizen of the United States, and a resident of Greenwood, in the county of Albemarle and State of Virginia, have invented new and useful Improvements in Tractor-Plows, of which the following is a specification.

My invention relates to tractor plows.

The object of my invention is to produce a motor driven plow adapted to break or break and turn a plurality of furrows, and which is capable of being manipulated and turned within a narrow space.

A further object thereof is to produce a plow of said character in which the plow teeth are radially carried on the periphery of the motor driven drums in staggered relation.

Another object thereof is to produce, in a tractor plow, one or more drums provided with spring controlled tooth sockets in which the plow teeth of different character may be radially secured, and a still further object of my invention is to produce a more simple, cheap and efficient tractor plow than has heretofore been attained.

To these ends, my invention includes the combination and arrangement of component parts to be hereinafter described and more particularly pointed out in the claims.

In the accompanying drawings, in which like reference characters indicate similar parts, Figure 1 is a ground plan view of my tractor plow; Fig. 2 is a side view thereof; Fig. 3 is a sectional view of the drums taken on the line 3—3 of Fig. 1; Fig. 4 is a detail view of one of the tooth sockets; Fig. 5 is a detail surface view of a tooth socket; Fig. 6 is a sectional view of the clutch members of my driving gear; and Fig. 7 is a detail view of a spading tooth.

Referring to the drawings, 1 indicates a bifurcated frame, at the fore part of which is mounted the steering wheel 2 on the vertical shaft 3, and between the divided rear ends of which is carried the toothed drums 4 on the horizontal shaft 5. The divided members of the frame 1 are braced by the cross bar 6 intermediate their ends.

In the preferred embodiment of my invention, I provide a pair of drums 4 in which the plow teeth A are radially carried. The drums are propelled by the chains 7 passing over the sprocket wheels 8 adapted to be coupled with either or both of the drums by the clutch members 9. Each of said drums 4 comprise segmental sections 4' suitably mounted on the hubs 10, and bolted together on the spokes 4ª, as shown. Each of said segments is provided with a plurality of radial tubes 11 the outer ends of which register with the openings 12 in the periphery of the drums, and through which the radial teeth project. The teeth are carried in a socket 13, which, as shown, is pressed flush with the face of the peripheral plate of the rollers by the spring 14 to permit the teeth to incase in the tubes when they encounter a stump, stone or other obstruction that they cannot penetrate, to prevent the fracture of the teeth or stalling of the plow.

As shown in the drawing, the openings 12 in the periphery of the drums are provided with lateral slots 12ª adapted to accommodate spade teeth hereinafter described. The teeth are arranged in staggered relation on the drums so that they separately and successively contact with the ground in the rotation of the drums. Each tooth comprises a stem 15 to be removably secured in the socket 13, and the blade 16 projecting beyond the face of the drum. Said teeth may be secured in the sockets 13 by wedges B or other suitable means. Any preferred form of blade may be employed, according to the nature of the ground and the result desired. As shown in Figs. 1 to 5, a pointed tooth is provided, while in Fig. 6, a curved spading blade 16' is disclosed adapted to turn the soil in furrows.

A suitable gas engine 17 is mounted on the frame for driving the chains 7, and, as shown, a steering gear 18 is coupled with the fore wheel 2 within convenient control of the operator seated on the seat 19.

For the purpose of driving the drums 4 either separately or simultaneously, the chains 7 are driven by separate sprocket wheels C and D loosely mounted on the drive shaft 20. The adjacent face of each sprocket wheel is provided with a central tapered recess adapted to receive the cones 21 rigidly carried on the shaft. On the opposite faces of the sprocket wheels are provided hubs 21' having an annular groove 22 in each in which the ends of the bell-crank levers 23 are carried. Said sprocket wheels are normally pressed into engagement with the cones 21 by the springs 24. The sprocket wheels C and D and clutch members thus described are connected with the steering gear by the bell-crank levers 23 and crossed rods 25 attached to the plate 26, through the medium of which one of the sprocket wheels will be thrown out of action when the plow is turned and the drum toward which the steering wheel is turned is disconnected from the drive shaft and rendered idle to act as a turning pivot.

Having thus described my invention, what I claim as new and desire to be secured by Letters Patent, is—

1. In a tractor plow, a drum having a plurality of openings in its periphery, spring pressed sockets carried in said drum registering with said openings, and projecting plow teeth removably secured in said sockets.

2. In a tractor plow, a drum having a plurality of openings in the periphery thereof, radial tubes registering at their outer ends with said openings, a tooth socket carried in each of said tubes, a spring in each tube for normally pressing said socket outwardly, and a plow tooth removably secured in each of said sockets adapted to normally project from the drum and to recede within the tubes upon encountering an impenetrable obstruction, substantially as described.

HENSON R. BOSWELL.

Witnesses:
L. BERT NYE,
R. H. YOUNG.